(12) United States Patent
Yanada et al.

(10) Patent No.: US 8,817,139 B2
(45) Date of Patent: Aug. 26, 2014

(54) IMAGE PICKUP DEVICE AND SIGNAL TRANSMITTING DEVICE

(75) Inventors: Takashi Yanada, Tokyo (JP); Yoshinobu Tanaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 88 days.

(21) Appl. No.: 13/602,999

(22) Filed: Sep. 4, 2012

(65) Prior Publication Data

US 2013/0063630 A1    Mar. 14, 2013

(30) Foreign Application Priority Data

Sep. 14, 2011    (JP) .................................. 2011-200422

(51) Int. Cl.
*H04N 9/07*    (2006.01)
*H04N 3/14*    (2006.01)
*H04N 9/04*    (2006.01)
*H04N 5/378*    (2011.01)

(52) U.S. Cl.
CPC ............... *H04N 5/378* (2013.01); *H04N 9/045* (2013.01); *H04N 9/07* (2013.01)
USPC .......................................... 348/266; 348/302

(58) Field of Classification Search
USPC ......... 348/266, 302, 280, 281, 268, 272, 294; 250/208.1; 257/291–292
See application file for complete search history.

(56) References Cited

U.S. PATENT DOCUMENTS

2007/0139540 A1* 6/2007 Ohara et al. ................... 348/280
2009/0046174 A1* 2/2009 Yoneda et al. ............ 348/231.99
2009/0059050 A1* 3/2009 Sakamoto ..................... 348/311

FOREIGN PATENT DOCUMENTS

JP    2008-005048 A    1/2008

* cited by examiner

*Primary Examiner* — Mekonnen Dagnew
(74) *Attorney, Agent, or Firm* — Westerman, Hattori, Daniels & Adrian, LLP

(57) ABSTRACT

An image pickup device may include an image capturing unit that includes a solid-state image pickup device having a plurality of pixels arrayed in a matrix form and simultaneously outputting pixel signals of the plurality of pixels adjacent to each other in a row or column direction in sequence while sequentially shifting the pixels that output the pixel signals in the row direction, and that simultaneously outputs image capturing signals respectively corresponding to the simultaneously output pixel signals in sequence from corresponding output terminals, an image processing unit to which the image capturing signals respectively corresponding to the plurality of pixels adjacent to each other in the row or column direction of the pixels arrayed in the solid-state image pickup device are simultaneously input in sequence from corresponding input terminals, and which performs image processing on the input image capturing signals, and a signal transmitting unit.

8 Claims, 6 Drawing Sheets

FIG. 3

IMAGE PICKUP DEVICE AND SIGNAL TRANSMITTING DEVICE

BACKGROUND OF THE INVENTION

1. Field of the Invention

The present invention relates to an image pickup device and a signal transmitting device.

Priority is claimed on Japanese Patent Application No. 2011-200422, filed Sep. 14, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, solid-state image pickup devices (hereinafter referred to as "imagers") that simultaneously output signals (hereinafter referred to as "pixel signals") of a plurality of pixels have increasingly been mounted on image capturing units of image pickup devices such as digital cameras, as the image pickup devices operate at high speed. Examples of output types of an imager that simultaneously outputs a plurality of pixel signals include an output type of simultaneously outputting pixel signals of two pixels adjacent to each other in a horizontal direction and an output type of simultaneously outputting pixel signals of two pixels adjacent to each other in a vertical direction.

With advancement in performance of future new image pickup devices, various methods of outputting pixel signals from imagers are being considered. However, even when there is a difference between output types of outputting pixel signals from imagers, image capturing processing units (so-called image capturing sub-systems) located at a rear stage to process pixel signals preferably have the same configuration to correspond to imagers that realize various output types.

Accordingly, for example, Japanese Unexamined Patent Application, First Publication No. 2008-005048 (hereinafter referred to as "Patent Document 1") discloses technology for realizing imagers in which output types of outputting pixel signals are different. FIG. 6 is a block diagram illustrating the overall configuration of an image pickup device in accordance with the related art, as disclosed in Patent Document 1. The image pickup device in accordance with the related art includes image processing units (first and second image processing units) corresponding to the number of channels (two channels in FIG. 6) of image data output from an image capturing unit. An AE evaluation value calculating unit and an AF evaluation value generating unit generate AE and AF evaluation values, respectively, after decimation units of the AE evaluation value calculating unit and the AF evaluation value generating unit perform a process of selecting (decimation) a plurality of simultaneously input image data (in FIG. 6, two pieces of image data), respectively.

In the image pickup device in accordance with the related art shown in FIG. 6, operations are switched depending on the number of channels of image data output by the image capturing unit. More specifically, when the number of channels of image data output by the image capturing unit is one (1 ch), the first image processing unit performs image processing and writes a processed image to a DRAM via a direct memory access interface (DMAIF) unit. Further, the AE evaluation value calculating unit and the AF evaluation value generating unit generate the evaluation values, respectively, without performing the decimation process, and write the generated evaluation values to the DRAM via the DMAIF unit.

On the other hand, when the number of channels of the image data output by the image capturing unit is two (2 ch), the first and second image processing units perform image processing and writes processed images to the DRAM via the DMAIF unit. At this time, when the image data of two pixels adjacent to each other in the horizontal direction are simultaneously input from the image capturing unit to the first and second image processing units, images obtained through the image processing by the first and second image processing units are combined (merged) and the result is written to the DRAM via the DMAIF unit. The AE evaluation value calculating unit performs a decimation process on the input image data, generates an AE evaluation value, and then writes the generated AE evaluation value to the DRAM via the DMAIF unit. Further, when generating a luminance signal (Y signal) based on the input image data, the AF evaluation value calculating unit performs a decimation process, generates an AF evaluation value based on the luminance signal obtained through the decimation process, and then writes the generated AF evaluation value to the DRAM via the DMAIF unit.

Thus, in the image pickup device in accordance with the related art disclosed in Patent Document 1, operations or functions of the constituent elements of the image pickup device are switched depending on the number of channels or output types of the image data output by the image capturing unit, and thus various output types of imagers can be realized.

However, when the image processing units or the like located at the rear stage to process pixel signals output from the imager are configured to correspond to various output types of the pixel signals output from the imager, as in the technology disclosed in Patent Document 1, the DMAIF unit (and functions associated with the control of a DMA by the DMAIF unit) connected to an image processing unit 2 may sometimes operate and sometimes not operate depending on the output types of the image data output by the image capturing unit in the image pickup device in accordance with the related art shown in FIG. 6. More specifically, the DMAIF unit connected to the image processing unit 2 is a circuit that operates only when the output type of the image data output by the image capturing unit is a type of simultaneously outputting the image data of two pixels adjacent to each other in the vertical direction, whereas the circuit does not operate when the output type of the image data is a type of simultaneously outputting the image data of two pixels adjacent to each other in the horizontal direction. Further, as in the AE evaluation value calculating unit and the AF evaluation value calculating unit, there are circuits that operate or do not operate depending on the output type of the image data output by the image capturing unit.

Thus, in the method in accordance with the related art, to correspond to various output types of the pixel signals output from the imager, an unnecessary circuit that may not operate depending on the output type of the pixel signals output by the imager mounted on the image pickup device may be present in the image processing unit or the like at the rear stage. Since the unnecessary circuit increases the circuit size of the image processing unit or the like, the unnecessary circuit is preferably not present in the image processing unit or the like.

SUMMARY

According to an aspect of the invention, there are provided an image pickup device and a signal transmitting device capable of realizing a configuration in which an unnecessary circuit is not present in an image processing unit or the like at a rear stage, even when there is a difference between output types of outputting pixel signals from a solid-state image pickup device.

An image pickup device may include: an image capturing unit that includes a solid-state image pickup device having a plurality of pixels arrayed in a matrix form and simultaneously outputting pixel signals of the plurality of pixels adjacent to each other in a row or column direction in sequence while sequentially shifting the pixels that output the pixel signals in the row direction, and that simultaneously outputs image capturing signals respectively corresponding to the simultaneously output pixel signals in sequence from corresponding output terminals, an image processing unit to which the image capturing signals respectively corresponding to the plurality of pixels adjacent to each other in the row or column direction of the pixels arrayed in the solid-state image pickup device are simultaneously input in sequence from corresponding input terminals, and which performs image processing on the input image capturing signals, and a signal transmitting unit that rearranges a sequence of the image capturing signals simultaneously input from the image capturing unit into a sequence of the image capturing signals to which the image processing unit corresponds, and that simultaneously outputs the rearranged image capturing signals as the image capturing signals output by the image capturing unit in sequence to the image processing unit.

The signal transmitting unit may include a plurality of line memories that sequentially hold the plurality of image capturing signals simultaneously input from the image capturing unit and sequentially outputs the held image capturing signals.

The solid-state image pickup device of the image capturing unit may be a solid-state image pickup device having a Bayer array. The line memories may at least hold the image capturing signals corresponding to one line of the pixels of the same color arrayed in the solid-state image pickup device. The signal transmitting unit may include the line memories that at least hold the image capturing signals of the pixels of the same color corresponding to two lines for each color of the pixels.

The signal transmitting unit may include: a first signal distributing unit that distributes the simultaneously input image capturing signals of each color corresponding to the pixels of each color to the line memories corresponding to each color of the pixels, respectively; a memory writing control unit that sequentially writes the distributed image capturing signals of each color to the line memories of the corresponding color; a memory reading control unit that sequentially reads the image capturing signals of each color held in the line memories corresponding to each color in order of the sequence of the colors of the image capturing signals to which the image processing unit corresponds; and a second signal distributing unit that distributes the read image capturing signals of each color to the corresponding input terminals of the image processing unit, respectively.

After the image capturing signals of all kinds of the colors in the solid-state image pickup device are written by at least one image capturing signal to the line memories of the corresponding colors, the memory reading control unit may start a process of reading the image capturing signals held in the line memories and completes the process of reading the image capturing signals held in the line memories before a subsequent process of writing the image capturing signals starts.

When the image capturing unit sequentially outputs the image capturing signals of two pixels adjacent to each other in the column direction corresponding to the pixel signals of the two pixels adjacent to each other in the column direction of the pixels arrayed in the solid-state image pickup device and the image processing unit performs image processing on the image capturing signals of two pixels adjacent to each other in the row direction of the pixels arrayed in the solid-state image pickup device, the signal transmitting unit may rearrange a sequence of the image capturing signals of the two pixels in the column direction simultaneously input from the image capturing unit into a sequence of the image capturing signals of the two pixels in the row direction to which the image processing unit corresponds and outputs the rearranged image capturing signals to the image processing unit as the image capturing signals of the two adjacent pixels in the row direction output by the image capturing unit.

When the image capturing unit sequentially outputs the image capturing signals of two pixels adjacent to each other in the row direction corresponding to the pixel signals of the two pixels adjacent to each other in the row direction of the pixels arrayed in the solid-state image pickup device and the image processing unit performs image processing on the image capturing signals of two pixels adjacent to each other in the column direction of the pixels arrayed in the solid-state image pickup device, the signal transmitting unit may rearrange a sequence of the image capturing signals of the two pixels in the row direction simultaneously input from the image capturing unit into a sequence of the image capturing signals of the two pixels in the column direction to which the image processing unit corresponds and outputs the rearranged image capturing signals to the image processing unit as the image capturing signals of the two adjacent pixels in the column direction output by the image capturing unit.

A signal transmitting device may include: a plurality of line memories that respectively hold a plurality of image capturing signals simultaneously input from an image capturing unit which includes a solid-state image pickup device having a plurality of pixels arrayed in a matrix form and simultaneously outputting pixel signals of the plurality of pixels adjacent to each other in a row or column direction in sequence while sequentially shifting the pixels that output the pixel signals in the row direction, and that simultaneously outputs the image capturing signals respectively corresponding to the simultaneously output pixel signals in sequence from corresponding output terminals; a first signal distributing unit that distributes the plurality of simultaneously input image capturing signals to the line memories corresponding to the image capturing signals, respectively; a memory writing control unit that sequentially writes the distributed image capturing signals to the corresponding line memories; a memory reading control unit to which the image capturing signals held in the line memories and respectively corresponding to the plurality of pixels adjacent in the row or column direction of the pixels arrayed in the solid-state image pickup device are simultaneously input in sequence from corresponding input terminals, and which sequentially reads the image capturing signals in a sequence of the image capturing signals to which an image processing unit that performs image processing on the input image capturing signals corresponds; and a second signal distributing unit that distributes the read image capturing signals to input terminals of the image processing unit corresponding to the image capturing signals, respectively.

The memory reading control unit may generate a synchronization signal indicating an output duration of the image capturing signals held in the line memories in the sequence of the image capturing signals to which the image processing unit corresponds, and output the generated synchronization signal as a synchronization signal which is simultaneously output when the image capturing unit outputs the image capturing signals and indicates an output duration of the image capturing signals corresponding to one line of the pixels arrayed in the solid-state image pickup device.

After the image capturing signals of all kinds of colors in the solid-state image pickup device are written by at least one image capturing signal to the line memories of the corresponding colors, the memory reading control unit may start a process of reading the image capturing signals held in the line memories and completes the process of reading the image capturing signals held in the line memories before a subsequent process of writing the image capturing signals starts.

According to aspects of the invention, it is possible to realize the configuration in which the unnecessary circuit is not present in the image processing unit or the like at the rear stage, even when there is a difference between the output types of outputting the pixel signals from the solid-state image pickup device.

BRIEF DESCRIPTION OF THE DRAWINGS

The above features and advantages of the present invention will be more apparent from the following description of certain preferred embodiments taken in conjunction with the accompanying drawings, in which:

FIG. 3 is a timing chart illustrating transmission timings of image data in a signal transmitting unit of the image pickup device in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
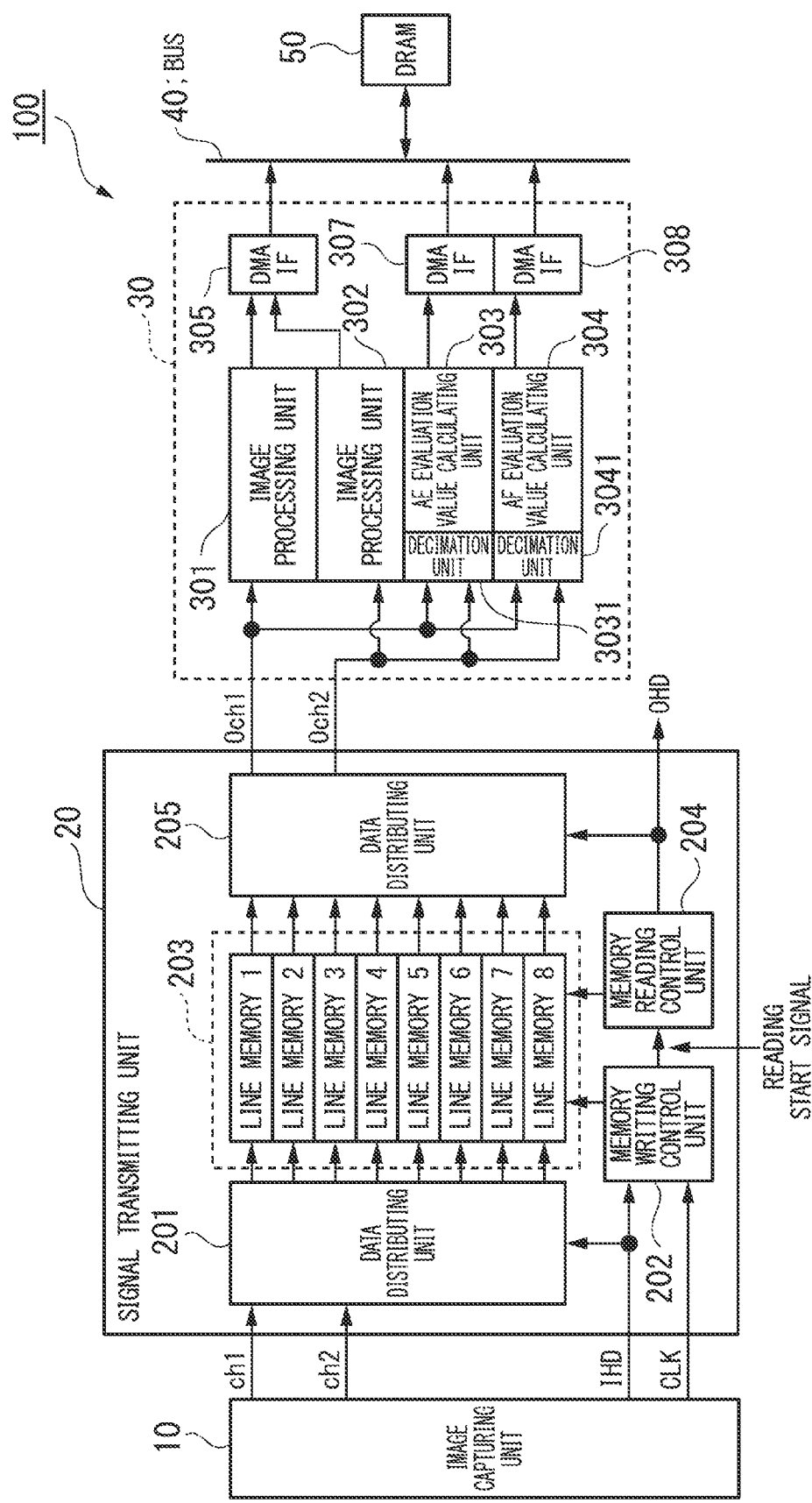
FIG. 1 is a block diagram illustrating an overall configuration of an image pickup device in accordance with a first preferred embodiment of the present invention.

Hereinafter, a first preferred embodiment of the present invention will be described with reference to the drawings. FIG. 1 is a block diagram illustrating the overall configuration of an image pickup device in accordance with the first preferred embodiment of the present invention. An image pickup device 100 shown in FIG. 1 includes an image capturing unit 10, a signal transmitting unit 20, image processing units 301 and 302, an AE evaluation value calculating unit 303, an AF evaluation value calculating unit 304, DMAIF units 305, 307, and 308, a bus 40, and a dynamic random access memory (DRAM) 50. In the image pickup device 100, an image processing device 30 is formed by the image processing units 301 and 302, the AE evaluation value calculating unit 303, the AF evaluation value calculating unit 304, and the DMAIF units 305, 307, and 308.

The image capturing unit 10 is configured by a lens, a solid-state image pickup device (imager), or the like. The image capturing unit 10 exposes an optical image of a subject formed on the imager through the lens under the control of a control unit (not shown). The image capturing unit 10 converts a pixel signal (analog signal) corresponding to the optical image of the subject exposed by the imager into a digital value and outputs the converted digital value to the signal transmitting unit 20.

Figure 2:
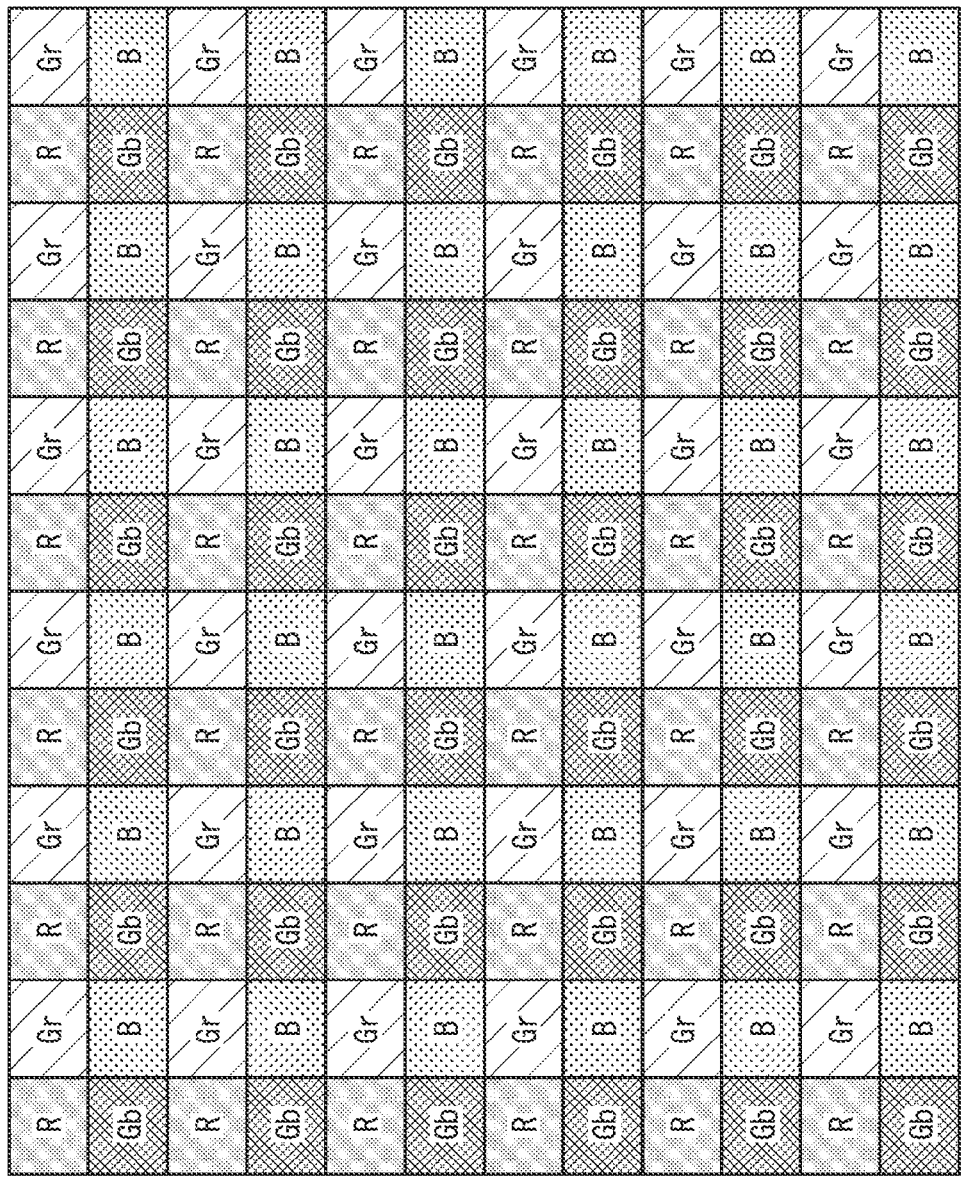
FIG. 2 is a diagram illustrating an example of a pixel array of a solid-state image pickup device included in the image pickup device in accordance with the first preferred embodiment of the present invention.

In the image pickup device 100 in accordance with the first preferred embodiment, the image capturing unit 10 includes the imager having a Bayer array that simultaneously outputs pixel signals of two pixels adjacent to each other in the vertical direction (column direction), as shown in FIG. 2. FIG. 2 is a diagram illustrating an example of the imager in which pixels of twelve rows by twelve columns are arrayed. When the imager shown in FIG. 2 simultaneously outputs the pixel signals of two pixels adjacent to each other in the vertical direction (column direction), the imager first simultaneously outputs the pixel signal of an R pixel from one channel and the pixel signal of a Gb pixel adjacent to the R pixel in the vertical direction (column direction) from the other channel. At the subsequent output timing, the imager simultaneously outputs the pixel signal of a Gr pixel from one channel and the pixel signal of a B pixel adjacent to the Gr pixel in the vertical direction (column direction) from the other channel. Thus, the imager of the image capturing unit 10 simultaneously outputs the pixel signals of two respective pixels adjacent to each other in the vertical direction (column direction) in sequence. Then, the image capturing unit 10 sequentially outputs digital values (hereinafter referred to as "image data") of image capturing signals corresponding to the pixel signals output from the channels of the imager from two output channels (Ch 1 and Ch 2) corresponding thereto, respectively.

The image capturing unit 10 outputs signals (an image capturing synchronization signal IHD and an image capturing clock CLK) indicating an output timing of the image data to the signal transmitting unit 20. The image data corresponding to the pixel signal output by the imager of the image capturing unit 10 and the output timing of the image data will be described later.

The image capturing unit 10 may further include a preprocessing unit that performs predetermined image processing (preprocessing) such as a correlated double sampling (CDS) process of suppressing a noise component of a pixel signal output from the imager.

The signal transmitting unit 20 rearranges a sequence of the image data input from the image capturing unit 10 to the image data to be image-processed through image processing of the image processing device 30 and outputs the rearranged image data to the image processing device 30.

In the image pickup device 100 in accordance with the first preferred embodiment, the image processing device 30 corresponds to an imager that has a Bayer array that simultaneously outputs the pixel signals of two pixels adjacent to each other in the horizontal direction (row direction). Accordingly, the signal transmitting unit 20 rearranges the sequence of the input image data, for which two pixels adjacent to each other in the vertical direction (column direction) have a simultaneous type (hereinafter referred to as a "vertical 2 ch type"), into the sequence of the image data, for which the two pixels adjacent to each other in the horizontal direction (row direction) have a simultaneous type (hereinafter referred to as a "horizontal 2 ch type"), and then outputs the rearranged image data to the image processing device 30. Further, the signal transmitting unit 20 outputs a signal (image synchronization signal OHD) indicating an output timing of the image data. An operation timing of each constituent element at the rear stage of the image processing device 30 is determined based on the image synchronization signal OHD output by the signal transmitting unit 20. Further, the configuration of the signal transmitting unit 20 and a method of rearranging the image data in the signal transmitting unit 20 will be described in detail later.

The image processing device 30 performs various kinds of image processing in the image pickup device 100 on the image data input from the signal transmitting unit 20 based on the image synchronization signal OHD and the image capturing clock CLK. Then, data obtained through the image processing is stored in the DRAM 50, which is a storage unit of the image pickup device 100, via the bus 40.

More specifically, the image processing units 301 and 302 each generate an image by performing predetermined image processing on the image data input from the signal transmitting unit 20. Then, the images generated by the image processing units 301 and 302 are combined (merged) and are written to the DRAM 50 by the DMAIF 305. The AE evaluation value calculating unit 303 calculates an AE evaluation value by integrating the image data of each color (R, Gr, Gb, and B in the imager having the Bayer array shown in FIG. 2) input from the signal transmitting unit 20. Then, the DMAIF 307 writes the calculated AE evaluation value to the DRAM 50. Further, the AF evaluation value calculating unit 304 generates luminance signals (Y signals) based on the image data input from the signal transmitting unit 20 and calculates an AF evaluation value based on the generated Y signals. Then, the DMAIF 308 writes the calculated AF evaluation value to the DRAM 50. Since the image processing device 30 is the same as an image processing device in accordance with the related art configured to correspond to the imager of the horizontal 2 ch type, the detailed description thereof will not be repeated.

Next, the configuration of the signal transmitting unit 20 of the image pickup device 100 in accordance with the first preferred embodiment will be described in more detail. As described above, the signal transmitting unit 20 rearranges the sequence of the input image data of the vertical 2 ch type into the sequence of the image data of the horizontal 2 ch type. The signal transmitting unit 20 includes a data distributing unit 201, a memory writing control unit 202, a line memory unit 203, a memory reading control unit 204, and a data distributing unit 205.

The line memory unit 203 holds the image data input from the data distributing unit 201 in response to a writing control signal input from the memory writing control unit 202. Further, the line memory unit 203 outputs the held image data to the data distributing unit 205 in response to a reading control signal input from the memory reading control unit 204.

The line memory unit 203 has line memories with capacities capable of holding the image data corresponding to four rows (lines) of the pixels arrayed on the imager. FIG. 1 shows the line memory unit 203 including eight line memories. That is, in the first preferred embodiment, the imager is configured to have the Bayer array that simultaneously outputs the pixel signals of two pixels adjacent to each other in the vertical direction (column direction). Therefore, since the image data corresponding to two lines are output from the image capturing unit 10 by one image capturing synchronization signal IHD, the line memory unit 203 can hold the images of each color (four colors of R, Gr, Gb, and B) corresponding to the two image capturing synchronization signals IHD.

When the line memories of the line memory unit 203 are distinguished from each other in the following description, the eight line memories are termed a line memory 1, a line memory 2, a line memory 3, a line memory 4, a line memory 5, a line memory 6, a line memory 7, and a line memory 8. In the first preferred embodiment, the line memories 1 to 4 are configured to correspond to the image data of each color (R, Gr, Gb, and B) output from output channels Ch 1 and Ch 2 at the timings of odd image capturing synchronization signals IHD output from the image capturing unit 10. Further, the line memories 5 to 8 are configured to correspond to the image data of each color (R, Gr, Gb, and B) output from output channels Ch 1 and Ch 2 at the timings of even image capturing synchronization signals IHD output from the image capturing unit 10.

In regard to the line memories 1 to 8 of the line memory unit 203, the line memories holding each image data are determined in advance for each color of the image data output by the imager. In the first preferred embodiment, the line memories 1 and 5 hold R image data for R pixels of the imager, the line memories 2 and 6 hold Gr image data for Gr pixels of the imager, the line memories 3 and 7 hold Gb image data for Gb pixels of the imager, and the line memories 4 and 8 hold B image data for B pixels of the imager.

Based on the image capturing synchronization signal IHD input from the image capturing unit 10, the data distributing unit 201 determines whether the currently input image data is the image data of the timing of an odd image capturing synchronization IHD or the image data of the timing of an even image capturing synchronization signal IHD. Then, based on the determination result, the data distributing unit 201 distributes output destinations of the image data having input from the output channels Ch 1 and Ch 2 of the image capturing unit 10 to the line memories 1 to 8 of the line memory unit 203.

More specifically, the data distributing unit 201 switches the output destinations of the image data input from the output channels Ch 1 and Ch 2 such that the R image data, the Gr image data, the Gb image data, and the B image data input at the timings of the odd image capturing synchronization signals IHD are distributed to the line memories 1, 2, 3, and 4, respectively. Further, the data distributing unit 201 switches the output destinations of the image data input from the output channels Ch 1 and Ch 2 such that the R image data, the Gr image data, the Gb image data, and the B image data input at the timings of the even image capturing synchronization signals IHD are distributed to the line memories 5, 6, 7, and 8, respectively. Thereafter, the output destinations of the image data are repeatedly switched based on the image capturing synchronization signal IHD in the same way.

The memory writing control unit 202 outputs a writing control signal used to control a process of writing the image data to each of the line memories 1 to 8 of the line memory unit 203 in accordance with the image capturing synchronization signal IHD and the image capturing clock CLK input from the image capturing unit 10. The control of the writing process to each of the line memories 1 to 8 of the line memory unit 203 by the memory writing control unit 202 is performed at a timing synchronized with the image capturing synchronization signal IHD and the image capturing clock CLK.

More specifically, the memory writing control unit 202 controls the process of writing the image data such that the R image data and the Gr image data input from the output channel Ch 1 at the timings of the odd image capturing synchronization signals IHD and the Gb image data and the B image data input from the output channel Ch 2 at the timings of the odd image capturing synchronization signals IHD are written to the line memories 1, 2, 3, and 4, respectively. Further, the memory writing control unit 202 controls the process of writing the image data such that the R image data and the Gr image data input from the output channel Ch 1 at the timings of the even image capturing synchronization signals IHD and the Gb image data and the B image data input from the output channel Ch 2 at the timings of the even image capturing synchronization signals IHD are written to the line memories 5, 6, 7, and 8, respectively. Thereafter, the process of writing the image data input at the timings of the image capturing synchronization signals IHD to the line memories 1 to 8 is repeatedly controlled in the same way.

When the image data input at the timing of one image capturing synchronization signal IHD are completely written to the line memory unit 203, the image data completely written and held in the line memories can be read.

The memory reading control unit 204 outputs a reading control signal used to control a process of reading the image data held in the line memories 1 to 8 of the line memory unit 203 in response to a reading start signal from the control unit (not shown). Then, the memory reading control unit 204 generates and outputs the image synchronization signal OHD indicating a timing of the image data read from the line memory unit 203. The image processing device 30 performs various kinds of image processing in the image pickup device 100 based on the image synchronization signal OHD output by the signal transmitting unit 20.

More specifically, the memory reading control unit 204 controls the process of reading the image data such that the R image data held in the line memory 1 and the Gr image data held in the line memory 2 are simultaneously read at the timing of the first image synchronization signal OHD. The memory reading control unit 204 also controls the process of reading the image data such that the Gb image data held in the line memory 3 and the B image data held in the line memory 4 are simultaneously read at the timing of the second image synchronization signal OHD. The memory reading control unit 204 also controls the process of reading the image data such that the R image data held in the line memory 5 and the Gr image data held in the line memory 6 are simultaneously read at the timing of the third image synchronization signal OHD. The memory reading control unit 204 also controls the process of reading the image data such that the Gb image data held in the line memory 7 and the B image data held in the line memory 8 are simultaneously read at the timing of the fourth image synchronization signal OHD. Thereafter, the process of reading the image data at the timing of the image synchronization signal OHD from the line memories 1 to 8 is repeatedly controlled in the same way.

The memory reading control unit 204 may be configured to generate and output an image clock signal as a signal indicating a timing of each image data read from the line memory unit 203 as well as the image synchronization signal OHD. In this case, the image processing device 30 performs various kinds of image processing in the image pickup device 100 based on the image clock signal output by the memory reading control unit 204 instead of the image capturing clock CLK.

Based on the image synchronization signal OHD input from the memory reading control unit 204, the data distributing unit 205 determines how many times the image synchronization signal OHD is output when the currently output image data (the image data held in the line memories 1 to 8) are read. Then, based on the determination result, the data distributing unit 205 distributes and outputs the image data read from the line memories 1 to 8 of the line memory unit 203 to output channels Och 1 and Och 2.

More specifically, the data distributing unit 205 switches the output destinations of the image data read from the line memories 1 and 2 such that the R image data read from the line memory 1 and the Gr image data read from the line memory 2 are distributed and output to the output channels Och 1 and Och 2, respectively, at the timing of the first image synchronization signal OHD. The data distributing unit 205 also switches the output destinations of the image data read from the line memories 3 and 4 such that the Gr image data read from the line memory 3 and the B image data read from the line memory 4 are distributed and output to the output channels Och 1 and Och 2, respectively, at the timing of the second image synchronization signal OHD. The data distributing unit 205 also switches the output destinations of the image data read from the line memories 5 and 6 such that the R image data read from the line memory 5 and the Gr image data read from the line memory 6 are distributed and output to the output channels Och 1 and Och 2, respectively, at the timing of the third image synchronization signal OHD. The data distributing unit 205 also switches the output destinations of the image data read from the line memories 7 and 8 such that the Gr image data read from the line memory 7 and the B image data read from the line memory 8 are distributed and output to the output channels Och 1 and Och 2, respectively, at the timing of the fourth image synchronization signal OHD. Thereafter, the output destinations of the image data are repeatedly switched based on the image synchronization signal OHD in the same way.

Figure 3:
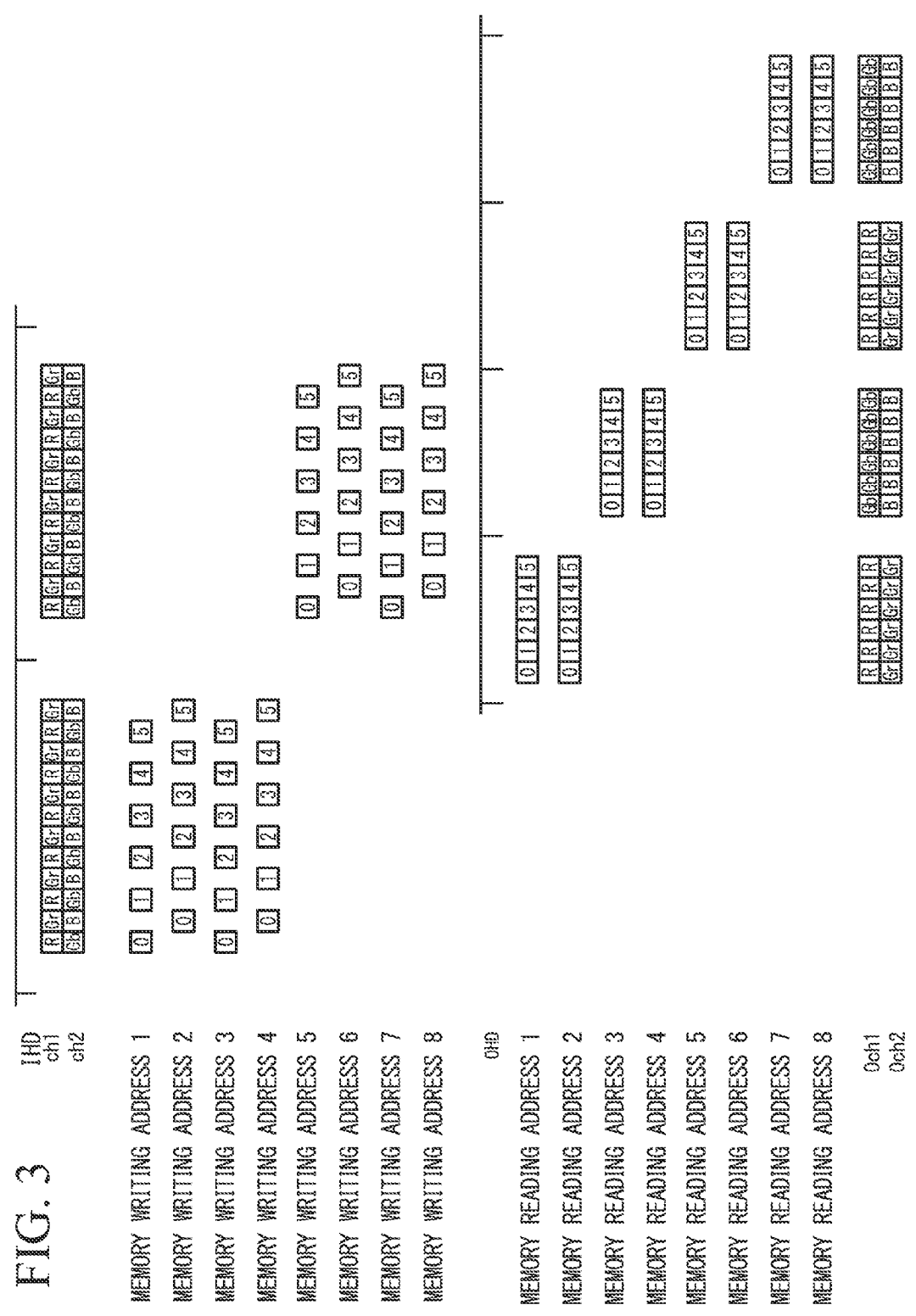

Next, a method of rearranging the image data in the signal transmitting unit 20 of the image pickup device 100 in accordance with the first preferred embodiment will be described. FIG. 3 is a timing chart illustrating transmission timings of the image data in the signal transmitting unit 20 of the image pickup device 100 in accordance with the first preferred embodiment of the present invention. FIG. 3 show a rearranging process corresponding to the two image capturing synchronization signals IHD, when the sequence of the image data output in the vertical 2 ch type by the imager shown in FIG. 2 are rearranged into the sequence of the image data of the horizontal 2 ch type to be output. In FIG. 3, writing addresses and reading addresses of the line memories are shown as the writing control signal and the reading control signal of the line memories 1 to 8.

First, the process of writing the image data output from the image capturing unit 10 to the line memory unit 203 will be described. To begin with, during the period of the first image capturing synchronization signal IHD, the R image data and the Gr image data of the pixels in the first line arrayed on the imager are sequentially input from the output channel Ch 1 of the image capturing unit 10 to the signal transmitting unit 20. At the same time, the Gb image data and the B image data of the pixels in the second line arrayed on the imager are sequentially input from the output channel Ch 2 of the image capturing unit 10 to the signal transmitting unit 20.

At this time, the data distributing unit 201 switches the output destinations of the image data input from the output channel Ch 1 to the line memories 1 and 2. Further, the data distributing unit 201 switches the output destinations of the image data input from the output channel Ch 2 to the line memories 3 and 4. Thus, the R image data and the Gr image data are sequentially input to the line memories 1 and 2, and the Gb image data and the B image data are sequentially input to the line memories 3 and 4.

The memory writing control unit 202 outputs the writing control signal of the image data to the line memories 1 and 3 at odd image capturing clocks CLK and outputs the writing control signal of the image data to the line memories 2 and 4 at even image capturing clocks CLK. Thus, as understood from FIG. 3, only the R image data are sequentially written and held in the line memory 1. Likewise, only the Gr image data are sequentially written and held in the line memory 2, only the Gb image data are sequentially written and held in the line memory 3, and only the B image data are sequentially written and held in the line memory 4.

Next, during the period of the second image capturing synchronization signal IHD, the R image data and the Gr image data of the pixels in the third line arrayed on the imager are sequentially input from the output channel Ch 1 of the image capturing unit 10 to the signal transmitting unit 20. At the same time, the Gb image data and the B image data of the pixels in the fourth line arrayed on the imager are sequentially input from the output channel Ch 2 of the image capturing unit 10 to the signal transmitting unit 20.

At this time, the data distributing unit 201 switches the output destinations of the image data input from the output channel Ch 1 to the line memories 5 and 6. Further, the data distributing unit 201 switches the output destinations of the image data input from the output channel Ch 2 to the line memories 7 and 8. Thus, the R image data and the Gr image data are sequentially input to the line memories 5 and 6, and the Gb image data and the B image data are sequentially input to the line memories 7 and 8.

The memory writing control unit 202 outputs the writing control signal of the image data to the line memories 5 and 7 at odd image capturing clocks CLK and outputs the writing control signal of the image data to the line memories 6 and 8 at even image capturing clocks CLK. Thus, as understood from FIG. 3, only the R image data are sequentially written and held in the line memory 5, only the Gr image data are sequentially written and held in the line memory 6, only the Gb image data are sequentially written and held in the line memory 7, and only the B image data are sequentially written and held in the line memory 8.

Thereafter, the image data output from the image capturing unit 10 are written and held in corresponding line memories 1 to 8 for each color in the same way, while alternately switching the line memories 1 to 4 and the line memories 5 to 8 for each image capturing synchronization signal IHD.

Thus, the process of writing the image data to the line memories 1 to 8 is controlled such that the data distributing unit 201 switches the output destinations of the image data output from the image capturing unit 10 and the memory writing control unit 202 writes the image data for only colors corresponding to the line memories 1 to 8 of the line memory unit 203. Accordingly, only the image data for the corresponding color are written and held in each of the line memories 1 to 8.

Next, the process of reading the image data held in the line memory unit 203 will be described. The image data held in the line memories of the line memory unit 203 can start to be read when the image data corresponding to the period of one image capturing synchronization signal IHD are completely written, that is, when the image data of the pixels in the first and second lines arrayed on the imager are completely written. In FIG. 3, the reading process to be performed during the period of the first image synchronization signal OHD starts after the image data during the period of the first image capturing synchronization signal IHD is completely written.

When the image data are completely written during the period of the first image capturing synchronization signal IHD, the memory reading control unit 204 first generates and outputs the image synchronization signal OHD. Then, during the period of the first image synchronization signal OHD, the memory reading control unit 204 outputs the reading control signal for the held image data to the line memories 1 and 2. Accordingly, the R image data and the Gr image data are read sequentially from line memories 1 and 2 to the data distributing unit 205, respectively.

At this time, the data distributing unit 205 switches the output destination of the R image data read from the line memory 1 to the output channel Och 1 and switches the output destination of the Gr image data read from the line memory 2 to the output channel Och 2. Thus, as understood from FIG. 3, the R image data are sequentially output to the output channel Och 1 and the Gr image data are sequentially output to the output channel Och 2.

Next, during the period of the second image synchronization signal OHD, the memory reading control unit 204 outputs the reading control signal for the held image data to the line memories 3 and 4. Accordingly, the Gb image data and the B image data are read sequentially from the line memories 3 and 4 to the data distributing unit 205, respectively.

At this time, the data distributing unit 205 switches the output destination of the Gb image data read from the line memory 3 to the output channel Och 1 and switches the output destination of the B image data read from the line memory 4 to the output channel Och 2. Thus, as understood from FIG. 3, the Gb image data are sequentially output to the output channel Och 1 and the B image data are sequentially output to the output channel Och 2.

Next, during the period of the third image synchronization signal OHD, the memory reading control unit 204 outputs the reading control signal for the held image data to the line memories 5 and 6. Accordingly, the R image data and the Gr image data are read sequentially from the line memories 5 and 6 to the data distributing unit 205, respectively.

At this time, the data distributing unit 205 switches the output destination of the R image data read from the line memory 5 to the output channel Och 1 and switches the output destination of the Gr image data read from the line memory 6 to the output channel Och 2. Thus, as understood from FIG. 3, the R image data are sequentially output to the output channel Och 1 and the Gr image data are sequentially output to the output channel Och 2.

Next, during the period of the fourth image synchronization signal OHD, the memory reading control unit 204 outputs the reading control signal for the held image data to the line memories 7 and 8. Accordingly, the Gb image data and the B image data are read sequentially from the line memories 7 and 8 to the data distributing unit 205, respectively.

At this time, the data distributing unit 205 switches the output destination of the Gb image data read from the line memory 7 to the output channel Och 1 and switches the output destination of the B image data read from the line memory 8 to the output channel Och 2. Thus, as understood from FIG. 3, the Gb image data are sequentially output to the output channel Och 1 and the B image data are sequentially output to the output channel Och 2.

Thereafter, in the same way, the image data are output while sequentially switching the line memories 1 and 2, the line memories 3 and 4, the line memories 5 and 6, and the line memories 7 and 8 for each image synchronization signal OHD.

Thus, the memory reading control unit 204 controls the process of reading the image data from the line memories 1 to 8 of the line memory unit 203 such that the image data of the color corresponding to the output type (the horizontal 2 ch type) are read, and the data distributing unit 205 switches the output destinations of the read image data. Accordingly, the image data obtained by rearranging the sequence of the data are output from the signal transmitting unit 20.

In the first preferred embodiment, as described above, it is possible to rearrange the output type of the image data output from the image capturing unit 10 to an input type of the image data to which the image processing device 30 corresponds. Accordingly, it is not necessary to configure an unnecessary circuit, which is included in the image processing device using the method in accordance with the related art, corresponding to various output types of the pixel signals output from the imager in the image processing unit at the rear stage of the image capturing unit. Further, a developed image processing device may be applied to an image pickup device that includes an imager having an output type different from the output type of an imager to which the processing device corresponds.

In the first preferred embodiment, the signal transmitting unit 20 rearranges the sequence of the image data input from the image capturing unit 10 in the vertical 2 ch type into the sequence of the image data for the horizontal 2 ch type and outputs the result to the image processing device 30. In this case, as understood from FIG. 3, the image synchronization signal OHD is generated to have half of the period of the image capturing synchronization signal IHD. However, the period of the image synchronization signal OHD is not limited only to the timing in the first preferred embodiment. For example, when one-line image data of the colors (four colors of R, Gr, Gb, and B) of the imager are written to the line memories of the line memory unit 203, the memory reading control unit 204 can start outputting the image synchronization signal OHD or start reading the image data from the line memories at any timing. However, in regard to the period of the image synchronization signal OHD, the image data held in the line memories is required to be completely read before the memory writing control unit 202 starts writing the image data to the same line memories again. That is, the image synchronization signal OHD can be set to have a period different from the image capturing synchronization signal IHD when the image synchronization signal OHD is used at a timing at which the process of writing the image data to the line memories 1 to 8 of the line memory unit 203 and the process of reading the image data from the line memories 1 to 8 of the line memory unit 203 do not fail. Further, the start timing of the process of reading the image data from the line memories can be set not only after the process of writing the image data corresponding to one line to the line memories ends, but can also be advanced as long as the process of reading the image data from the line memories does not overtake the process of writing the image data to the line memories.

In the first preferred embodiment, the case in which the line memory unit 203 includes eight line memories and holds the image data of the colors (four colors of R, Gr, Gb, and B) of the two image capturing synchronization signals IHD has been described. However, the number of line memories of the line memory unit 203 is not limited to the number of line memories set in the first preferred embodiment. For example, the line memory unit may include twelve line memories and hold image data of the colors (four colors of R, Gr, Gb, and B) of three image capturing synchronization signals IHD. In this case, since a duration in which the process of writing the image data to the line memories of the line memory unit 203 and the process of reading the image data from the line memories of the line memory unit 203 do not fail is increased, the output timing of the image synchronization signal OHD can be set more freely.

Second Preferred Embodiment

Figure 4:
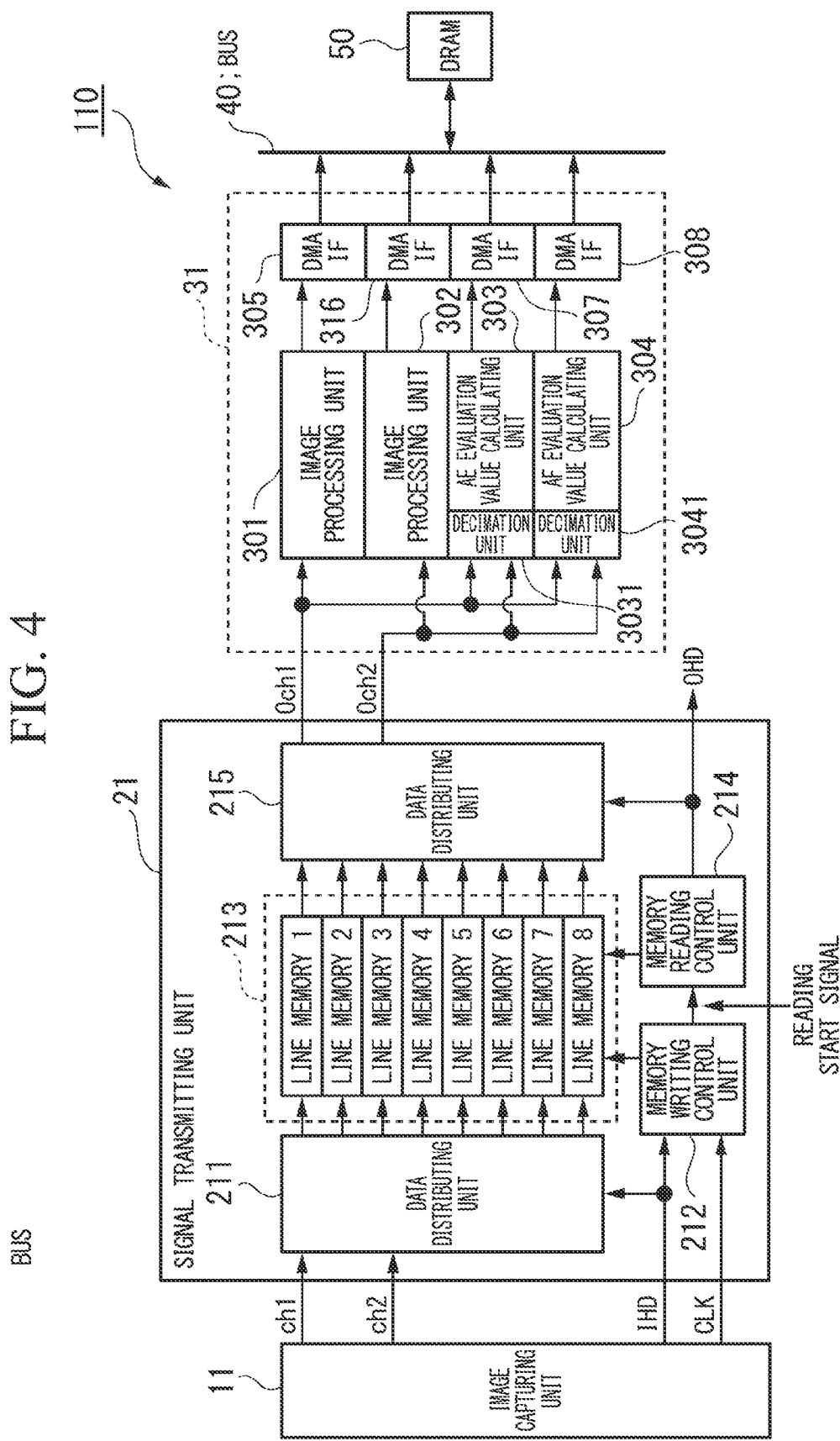
FIG. 4 is a block diagram illustrating an overall configuration of an image pickup device in accordance with a second preferred embodiment of the present invention.

Next, a second preferred embodiment of the present invention will be described. FIG. 4 is a block diagram illustrating the overall configuration of an image pickup device in accordance with the second preferred embodiment of the present invention. An image pickup device 110 shown in FIG. 4 includes an image capturing unit 11, a signal transmitting unit 21, image processing units 301 and 302, an AE evaluation value calculating unit 303, an AF evaluation value calculating unit 304, DMAIF units 305, 316, 307, and 308, a bus 40, and a dynamic random access memory (DRAM) 50. In the image pickup device 110, an image processing device 31 is formed by the image processing units 301 and 302, the AE evaluation value calculating unit 303, the AF evaluation value calculating unit 304, and the DMAIF units 305, 316, 307, and 308.

The image pickup device 110 in accordance with the second preferred embodiment is different from the image pickup device 100 in accordance with the first preferred embodiment in an output type of an imager of the image capturing unit 11 and a type of the imager corresponding to the image processing device 31. More specifically, the image capturing unit 10 of the image pickup device 100 in accordance with the first preferred embodiment includes the imager having the Bayer array that simultaneously outputs the pixel signals of two pixels adjacent to each other in the vertical direction (column direction). However, the image capturing unit 11 of the image pickup device 110 includes the imager having a Bayer array that simultaneously outputs the pixel signals of two pixels adjacent to each other in the horizontal direction (row direction). Further, the image processing device 30 of the image pickup device 100 in accordance with the first preferred embodiment is configured to correspond to the imager having the Bayer array that simultaneously outputs the pixel signals of two pixels adjacent to each other in the horizontal direction (row direction). However, the image processing device 31 is configured to correspond to an imager having a Bayer array that simultaneously outputs the pixel signals of two pixels adjacent to each other in the vertical direction (column direction). Accordingly, the signal transmitting unit 20 of the image pickup device 100 in accordance with the first preferred embodiment rearranges the sequence of the image data of the vertical 2 ch type into the sequence of the image data of the horizontal 2 ch type. However, the signal transmitting unit 21 rearranges the sequence of the image data of the horizontal 2 ch type into the sequence of the image data of the vertical 2 ch type.

In the following description, elements of the image pickup device 110 in accordance with the second preferred embodiment that are the same as elements of the image pickup device 100 in accordance with the first preferred embodiment are denoted by the same reference numerals as in the first preferred embodiment, and the detailed description thereof will not be repeated.

The image capturing unit 11 includes the imager having the Bayer array that simultaneously outputs the pixel signals of two pixels adjacent to each other in the horizontal direction (row direction), as shown in FIG. 2. The image capturing unit 11 converts the pixel signal (analog signal) corresponding to an optical image of a subject exposed by the imager into a digital value and outputs the converted digital value to the signal transmitting unit 21. When the imager shown in FIG. 2 simultaneously outputs the pixel signals of two pixels adjacent to each other in the horizontal direction (row direction), the imager first simultaneously outputs the pixel signal of an R pixel from one channel and the pixel signal of a Gr pixel adjacent to the R pixel in the horizontal direction (row direction) from the other channel. At the subsequent output timing, the imager simultaneously outputs the pixel signal of a Gb pixel from one channel and the pixel signal of a B pixel adjacent to the Gb pixel in the horizontal direction (row direction) from the other channel. Thus, the imager of the image capturing unit 11 simultaneously outputs the pixel signals of two respective pixels adjacent to each other in the horizontal direction (row direction) in sequence. Then, the image capturing unit 11 sequentially outputs the image data of the pixel signals output from the channels of the imager from two output channels (Ch 1 and Ch 2), respectively.

The image capturing unit 11 outputs an image capturing synchronization signal IHD and an image capturing clock CLK indicating an output timing of the image data to the signal transmitting unit 21. The image data corresponding to the pixel signal output by the imager of the image capturing unit 11 and the output timing of the image data will be described later.

The image capturing unit 11 may further include a preprocessing unit that performs predetermined image processing (preprocessing) such as a CDS process, as in the image capturing unit 10 in accordance with the first preferred embodiment.

The signal transmitting unit 21 rearranges a sequence of the image data of the horizontal 2 ch type input from the image capturing unit 11 into a sequence of the image data of the vertical 2 ch type to be image-processed through image processing of the image processing device 31, and outputs the rearranged image data to the image processing device 31. Further, the signal transmitting unit 21 outputs an image synchronization signal OHD indicating an output timing of the image data. An operation timing of each constituent element at the rear stage of the image processing device 31 is determined based on the image synchronization signal OHD output by the signal transmitting unit 21. Further, the configuration of the signal transmitting unit 21 and a method of rearranging the image data in the signal transmitting unit 21 will be described in detail later.

The image processing device 31 performs various kinds of image processing in the image pickup device 110 on the image data input from the signal transmitting unit 21 based on the image synchronization signal OHD and the image capturing clock CLK. Then, data obtained through the image processing is stored in the DRAM 50 via the bus 40.

More specifically, the image processing units 301 and 302 each generate an image by performing predetermined image processing on the image data input from the signal transmitting unit 21. Then, the DMAIF 305 and the DMAIF 316 write the images generated by the image processing units 301 and 302 to the DRAM 50, respectively. The AE evaluation value calculating unit 303 and the AF evaluation value calculating unit 304 calculate an AE evaluation value and an AF evaluation value for each color (R, Gr, Gb, and B in the imager having the Bayer array shown in FIG. 2) input from the signal transmitting unit 21. Then, the DMAIF 307 and the DMAIF 308 write the calculated AE evaluation value and the calculated AF evaluation value to the DRAM 50, respectively. Since the image processing device 31 is the same as an image processing device in accordance with the related art configured to correspond to the imager of the vertical 2 ch type, the detailed description thereof will not be repeated.

Next, the configuration of the signal transmitting unit 21 of the image pickup device 110 in accordance with the second preferred embodiment will be described in more detail. As described above, the signal transmitting unit 21 rearranges the sequence of the input image data of the horizontal 2 ch type into the sequence of the image data of the vertical 2 ch type. The signal transmitting unit 21 includes a data distributing unit 211, a memory writing control unit 212, a line memory unit 213, a memory reading control unit 214, and a data distributing unit 215.

The line memory unit 213 holds the image data input from the data distributing unit 211 in response to a writing control signal input from the memory writing control unit 212. Further, the line memory unit 213 outputs the held image data to the data distributing unit 215 in response to a reading control signal input from the memory reading control unit 214.

The line memory unit 213 has line memories with capacities capable of holding the image data corresponding to four rows (lines) of the pixels arrayed on the imager. FIG. 4 shows the line memory unit 213 that includes eight line memories. That is, in the second preferred embodiment, the imager is configured to have the Bayer array that simultaneously outputs the pixel signals of two pixels adjacent to each other in the horizontal direction (row direction). Therefore, since the image data corresponding to two pixels included in one line are output from the image capturing unit 11 by one image capturing synchronization signal IHD, the line memory unit 213 can hold the image data of each color (four colors of R, Gr, Gb, and B) for the four image capturing synchronization signals IHD.

When the line memories of the line memory unit 213 are distinguished from each other in the following description, the eight line memories are termed a line memory 1, a line memory 2, a line memory 3, a line memory 4, a line memory 5, a line memory 6, a line memory 7, and a line memory 8, as in the line memory unit 203 of the first preferred embodiment. In the second preferred embodiment, the line memories 1 and 2 are configured to correspond to the image data of colors (R and Gr) output from output channels Ch 1 and Ch 2 at the timing of the first image capturing synchronization signal IHD output from the image capturing unit 11. The line memories 3 and 4 are configured to correspond to the image data of colors (Gb and B) output from output channels Ch 1 and Ch 2 at the timing of the second image capturing synchronization signal IHD output from the image capturing unit 11. The line memories 5 and 6 are configured to correspond to the image data of colors (R and Gr) output from output channels Ch 1 and Ch 2 at the timing of the third image capturing synchronization signal IHD output from the image capturing unit 11. The line memories 7 and 8 are configured to correspond to the image data of colors (Gb and B) output from output channels Ch 1 and Ch 2 at the timing of the fourth image capturing synchronization signal IHD output from the image capturing unit 11.

In regard to the line memories 1 to 8 of the line memory unit 213, the line memories holding each image data are determined in advance for each color of the image data output by the imager, as in the line memory unit 203 of the first preferred embodiment. In the second preferred embodiment, the line memories 1 and 5 hold R image data for R pixels of the imager, the line memories 2 to 6 hold Gr image data for Gr pixels of the imager, the line memories 3 and 7 hold Gb image data for Gb pixels of the imager, and the line memories 4 and 8 hold B image data for B pixels of the imager, as in the line memory unit 203 of the first preferred embodiment.

Based on the image capturing synchronization signal IHD input from the image capturing unit 11, the data distributing unit 211 determines how many times the image capturing synchronization IHD is output when the currently input image data is input. Then, based on the determination result, the data distributing unit 211 distributes output destinations of the image data having input from the output channels Ch 1 and Ch 2 of the image capturing unit 11 to the line memories 1 to 8 of the line memory unit 213.

More specifically, the data distributing unit 211 switches the output destinations of the image data input from the output channels Ch 1 and Ch 2 such that the R image data and the Gr image data input at the timing of the first image capturing synchronization signal IHD are distributed to the line memories 1 and 2, respectively. The data distributing unit 211 switches the output destinations of the image data input from the output channels Ch 1 and Ch 2 such that the Gb image data and the B image data input at the timing of the second image capturing synchronization signal IHD are distributed to the line memories 3 and 4, respectively. The data distributing unit 211 switches the output destinations of the image data input from the output channels Ch 1 and Ch 2 such that the R image data and the Gr image data input at the timing of the third image capturing synchronization signal IHD are distributed to the line memories 5 and 6, respectively. The data distributing unit 211 switches the output destinations of the image data input from the output channels Ch 1 and Ch 2 such that the Gb image data and the B image data input at the timing of the fourth image capturing synchronization signal IHD are distributed to the line memories 7 and 8, respectively. Thereafter, the output destinations of the image data are repeatedly switched based on the image capturing synchronization signal IHD in the same way.

The memory writing control unit 212 outputs a writing control signal used to control a process of writing the image data to each of the line memories 1 to 8 of the line memory unit 213 in accordance with the image capturing synchronization signal IHD and the image capturing clock CLK input from the image capturing unit 11. The control of the writing process to each of the line memories 1 to 8 of the line memory unit 213 by the memory writing control unit 212 is performed at a timing synchronized with the image capturing synchronization signal IHD and the image capturing clock CLK.

More specifically, the memory writing control unit 212 controls the process of writing the image data such that the R image data and the Gr image data respectively input from the output channels Ch 1 and Ch 2 at the timing of the first image capturing synchronization signal IHD are written to the line memories 1 and 2, respectively. The memory writing control unit 212 controls the process of writing the image data such that the Gb image data and the B image data respectively input from the output channels Ch 1 and Ch 2 at the timing of the second image capturing synchronization signal IHD are written to the line memories 3 and 4, respectively. The memory writing control unit 212 controls the process of writing the image data such that the R image data and the Gr image data respectively input from the output channels Ch 1 and Ch 2 at the timing of the third image capturing synchronization signal IHD are written to the line memories 5 and 6, respectively. The memory writing control unit 212 controls the process of writing the image data such that the Gb image data and the B image data respectively input from the output channels Ch 1 and Ch 2 at the timing of the fourth image capturing synchronization signal IHD are written to the line memories 7 and 8, respectively. Thereafter, the process of writing the image data input at the timings of the image capturing synchronization signals IHD to the line memories 1 to 8 is repeatedly controlled in the same way.

When the image data input at the timings of the two image capturing synchronization signals IHD are completely written to the line memory unit 213, the image data completely written and held in the line memories can be read.

The memory reading control unit 214 outputs a reading control signal used to control a process of reading the image data held in the line memories 1 to 8 of the line memory unit 213 in response to a reading start signal from the control unit (not shown). Then, the memory reading control unit 214 generates and outputs the image synchronization signal OHD indicating a timing of the image data read from the line memory unit 213. The image processing device 31 performs various kinds of image processing in the image pickup device 110 based on the image synchronization signal OHD output by the signal transmitting unit 21.

More specifically, the memory reading control unit 214 controls the process of reading the image data such that the R image data held in the line memory 1, the Gr image data held in the line memory 2, the Gb image data held in the line memory 3, and the B image data held in the line memory 4 are simultaneously read at the timings of odd image synchronization signals OHD. Further, the memory reading control unit 214 controls the process of reading the image data such that the R image data held in the line memory 5, the Gr image data held in the line memory 6, the Gb image data held in the line memory 7, and the B image data held in the line memory 8 are simultaneously read at the timings of even image synchronization signals OHD. Thereafter, the process of reading the image data at the timing of the image synchronization signal OHD from the line memories 1 to 8 is repeatedly controlled in the same way.

The memory reading control unit 214 may be configured to generate and output an image clock signal as a signal indicating a timing of each group of image data read from the line memory unit 213 as well as the image synchronization signal OHD. In this case, the image processing device 31 performs various kinds of image processing in the image pickup device 110 based on the image clock signal output by the memory reading control unit 214 instead of the image capturing clock CLK.

Based on the image synchronization signal OHD input from the memory reading control unit 214, the data distributing unit 215 determines whether the currently output image data (the image data held in the line memories 1 to 8) are the image data at the timings of the odd image synchronization signals OHD or the image data at the timings of the even image synchronization signals OHD. Then, based on the determination result, the data distributing unit 215 distributes and outputs the image data read from the line memories 1 to 8 of the line memory unit 213 to output channels Och 1 and Och 2.

More specifically, the data distributing unit 215 switches the output destinations of the image data read from the line memories 1 to 4 such that, at the timings of the odd image synchronization signals OHD, the R image data read from the line memory 1 and the Gr image data read from the line memory 2 are distributed and output to the output channel Och 1, and the Gb image data read from the line memory 3 and the B image data read from the line memory 4 are distributed and output to the output channel Och 2. Further, the data distributing unit 215 switches the output destinations of the image data read from the line memories 5 to 8 such that, at the timings of the even image synchronization signals OHD, the R image data read from the line memory 5 and the Gr image data read from the line memory 6 are distributed and output to the output channel Och 1, and the Gb image data read from the line memory 7 and the B image data read from the line memory 8 are distributed and output to the output channel Och 2. Thereafter, the output destinations of the image data are repeatedly switched based on the image synchronization signal OHD in the same way.

Figure 5:
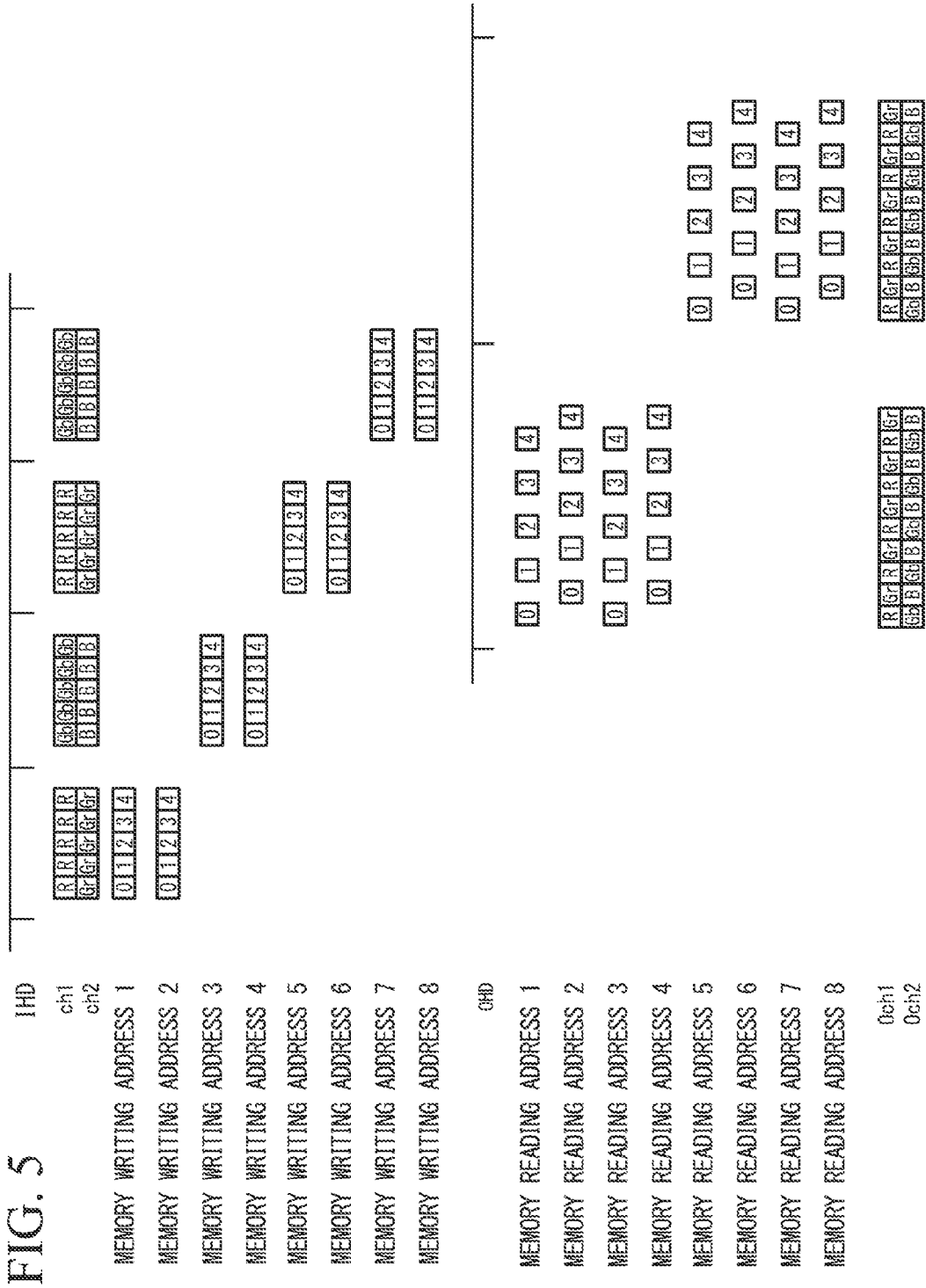
FIG. 5 is a timing chart illustrating transmission timings of image data in a signal transmitting unit of the image pickup device in accordance with the second preferred embodiment of the present invention.
Figure 6:
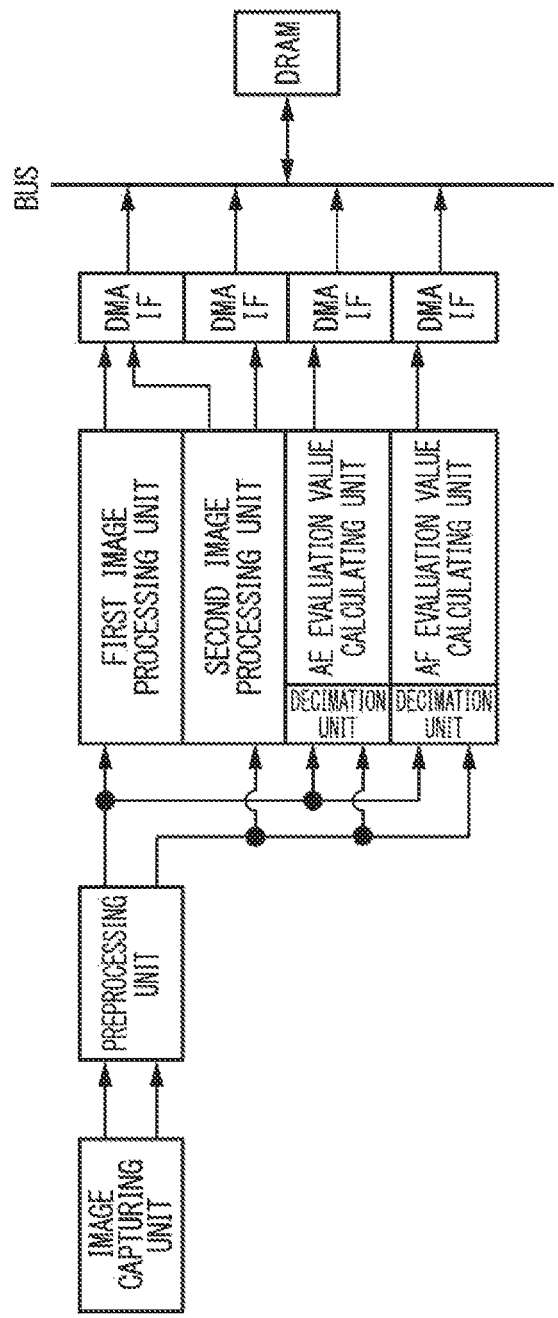
FIG. 6 is a block diagram illustrating an overall configuration of an image pickup device in accordance with the related art.

Next, a method of rearranging the image data in the signal transmitting unit 21 of the image pickup device 110 in accordance with the second preferred embodiment will be described. FIG. 5 is a timing chart illustrating transmission timings of the image data in the signal transmitting unit 21 of the image pickup device 110 in accordance with the second preferred embodiment of the present invention. FIG. 5 shows a rearranging process corresponding to the four image capturing synchronization signals IHD, when the sequence of the image data output in the horizontal 2 ch type by the imager shown in FIG. 2 are rearranged into the sequence of the image data of the vertical 2 ch type to be output. In FIG. 5, writing addresses and reading addresses of the line memories are shown as the writing control signal and the reading control signal of the line memories 1 to 8.

First, the process of writing the image data output from the image capturing unit 11 to the line memory unit 213 will be described. To begin with, during the period of the first image capturing synchronization signal IHD, the R image data of the pixels in the first line arrayed on the imager are sequentially input from the output channel Ch 1 of the image capturing unit 11 to the signal transmitting unit 21. At the same time, the Gr image data of the pixels in the first line arrayed on the imager are sequentially input from the output channel Ch 2 of the image capturing unit 11 to the signal transmitting unit 21.

At this time, the data distributing unit 211 switches the output destination of the image data input from the output channel Ch 1 to the line memory 1 and switches the output destination of the image data input from the output channel Ch 2 to the line memory 2. Thus, the R image data are sequentially input to the line memory 1, and the Gr image data are sequentially input to the line memory 2.

The memory writing control unit 212 outputs the writing control signal of the image data to the line memories 1 and 2 at each image capturing clock CLK. Thus, as understood from FIG. 5, the R image data are sequentially written and held in the line memory 1 and the Gr image data are sequentially written and held in the line memory 2.

Next, during the period of the second image capturing synchronization signal IHD, the Gb image data of the pixels in the second line arrayed on the imager are sequentially input from the output channel Ch 1 of the image capturing unit 11 to the signal transmitting unit 21. At the same time, the B image data of the pixels in the second line arrayed on the imager are sequentially input from the output channel Ch 2 of the image capturing unit 11 to the signal transmitting unit 21.

At this time, the data distributing unit 211 switches the output destination of the image data input from the output channel Ch 1 to the line memory 3 and switches the output destination of the image data input from the output channel Ch 2 to the line memory 4. Thus, the Gb image data are sequentially input to the line memory 3, and the B image data are sequentially input to the line memory 4.

The memory writing control unit 212 outputs the writing control signal of the image data to the line memories 3 and 4 at each image capturing clock CLK. Thus, as understood from FIG. 5, the Gb image data are sequentially written and held in the line memory 3 and the B image data are sequentially written and held in the line memory 4.

Next, during the period of the third image capturing synchronization signal IHD, the R image data of the pixels in the third line arrayed on the imager are sequentially input from the output channel Ch 1 of the image capturing unit 11 to the signal transmitting unit 21. At the same time, the Gr image data of the pixels in the third line arrayed on the imager are sequentially input from the output channel Ch 2 of the image capturing unit 11 to the signal transmitting unit 21.

At this time, the data distributing unit 211 switches the output destination of the image data input from the output channel Ch 1 to the line memory 5 and switches the output destination of the image data input from the output channel Ch 2 to the line memory 6. Thus, the R image data are sequentially input to the line memory 5, and the Gr image data are sequentially input to the line memory 6.

The memory writing control unit 212 outputs the writing control signal of the image data to the line memories 5 and 6 at each image capturing clock CLK. Thus, as understood from FIG. 5, the R image data are sequentially written and held in the line memory 5 and the Gr image data are sequentially written and held in the line memory 6.

Next, during the period of the fourth image capturing synchronization signal IHD, the Gb image data of the pixels in the fourth line arrayed on the imager are sequentially input from the output channel Ch 1 of the image capturing unit 11 to the signal transmitting unit 21. At the same time, the B image data of the pixels in the fourth line arrayed on the imager are sequentially input from the output channel Ch 2 of the image capturing unit 11 to the signal transmitting unit 21.

At this time, the data distributing unit 211 switches the output destination of the image data input from the output channel Ch 1 to the line memory 7 and switches the output destination of the image data input from the output channel Ch 2 to the line memory 8. Thus, the Gb image data are sequentially input to the line memory 7, and the B image data are sequentially input to the line memory 8.

The memory writing control unit 212 outputs the writing control signal of the image data to the line memories 7 and 8 at each image capturing clock CLK. Thus, as understood from FIG. 5, the Gb image data are sequentially written and held in the line memory 7 and the B image data are sequentially written and held in the line memory 8.

Thereafter, the image data output from the image capturing unit 11 are written and held in corresponding line memories 1 to 8 each in the same way, while alternately switching the line memories 1 and 2, the line memories 3 and 4, the line memories 5 and 6, and the line memories 7 and 8 for each image capturing synchronization signal IHD.

Thus, the process of writing the image data to the line memories 1 to 8 is controlled such that the data distributing unit 211 switches the output destinations of the image data output from the image capturing unit 11 and the memory writing control unit 212 writes the image data for the colors corresponding to the line memories 1 to 8 of the line memory unit 213. Accordingly, the image data for the corresponding color are written and held in each of the line memories 1 to 8.

Next, the process of reading the image data held in the line memory unit 213 will be described. The image data held in the line memories of the line memory unit 213 can start to be read when the image data corresponding to the period of the two image capturing synchronization signals IHD are completely written, that is, when the image data of the pixels in the first and second lines arrayed on the imager are completely written. In FIG. 5, the reading process to be performed during the period of the first image synchronization signal OHD starts after the image data during the period of the second image capturing synchronization signal IHD are completely written.

When the image data are completely written during the period of the second image capturing synchronization signal IHD, the memory reading control unit 214 first generates and outputs the image synchronization signal OHD. Then, during the period of the first image synchronization signal OHD, the memory reading control unit 214 outputs the reading control signal for the held image data to the line memories 1 and 3 by the odd image capturing clocks CLK, and outputs the reading control signal for the held image data to the line memories 2 and 4 by the even image capturing clocks CLK. Accordingly, the R image data held in the line memory 1 and the Gr image data held in the line memory 2 are read alternately to the data distributing unit 215. Likewise, the Gb image data held in the line memory 3 and the B image data held in the line memory 4 are read alternately to the data distributing unit 215.

At this time, the data distributing unit 215 switches the output destinations of the R image data read from the line memory 1 and the Gr image data read from the line memory 2 to the output channel Och 1, and switches the output destinations of the Gb image data read from the line memory 3 and the B image data read from the line memory 4 to the output channel Och 2. Thus, as understood from FIG. 5, the R image data and Gr image data are sequentially output to the output channel Och 1, and the Gb image data and the B image data are sequentially output to the output channel Och 2.

Next, during the period of the second image synchronization signal OHD, the memory reading control unit 214 outputs the reading control signal for the held image data to the line memories 5 and 7 by the odd image capturing clocks CLK, and outputs the reading control signal for the held image data to the line memories 6 and 8 by the even image capturing clocks CLK. Accordingly, the R image data held in the line memory 5 and the Gr image data held in the line memory 6 are read alternately to the data distributing unit 215. Likewise, the Gb image data held in the line memory 7 and the B image data held in the line memory 8 are read alternately to the data distributing unit 215.

At this time, the data distributing unit 215 switches the output destinations of the R image data read from the line memory 5 and the Gr image data read from the line memory 6 to the output channel Och 1, and switches the output destinations of the Gb image data read from the line memory 7 and the B image data read from the line memory 8 to the output channel Och 2. Thus, as understood from FIG. 5, the R image data and Gr image data are sequentially output to the output channel Och 1, and the Gb image data and the B image data are sequentially output to the output channel Och 2.

Thereafter, in the same way, the image data are output while alternately switching the line memories 1 to 4 and the line memories 5 to 8 for each image synchronization signal OHD.

Thus, the memory reading control unit 214 controls the process of reading the image data from the line memories 1 to 8 of the line memory unit 213 such that the image data of the color corresponding to the output type (the vertical 2 ch type) are read, and the data distributing unit 215 switches the output destinations of the read image data. Accordingly, the image data obtained by rearranging the sequence of the data are output from the signal transmitting unit 21.

In the second preferred embodiment, as described above, it is possible to rearrange the output type of the image data output from the image capturing unit 11 to an input type of the image data to which the image processing device 31 corresponds. Accordingly, as in the first preferred embodiment, it is not necessary to configure an unnecessary circuit included in the image processing device in the method of the related art. Therefore, a developed image processing device may be applied to an image pickup device that includes an imager having an output type different from the output type of an imager to which the image processing device corresponds.

In the second preferred embodiment, the signal transmitting unit 21 rearranges the sequence of the image data input from the image capturing unit 11 in the horizontal 2 ch type into the sequence of the image data for the vertical 2 ch type, and outputs the result to the image processing device 30. In this case, as understood from FIG. 5, the image synchronization signal OHD is generated to have double the period of the image capturing synchronization signal IHD. However, the period of the image synchronization signal OHD is not limited only to the timing in the second preferred embodiment. For example, when one-line image data of the colors (four colors of R, Gr, Gb, and B) of the imager are written to the line memories of the line memory unit 213, the memory reading control unit 214 can start outputting the image synchronization signal OHD or start reading the image data from the line memories at any timing. However, in regard to the period of the image synchronization signal OHD, the image data held in the line memories are required to be completely read before the memory writing control unit 212 starts writing the image data to the same line memories again. That is, the image synchronization signal OHD can be set to have a period different from the image capturing synchronization signal IHD when the image synchronization signal OHD is used at a timing at which the process of writing the image data to the line memories 1 to 8 of the line memory unit 213 and the process of reading the image data from the line memories 1 to 8 of the line memory unit 213 do not fail. Further, the start timing of the process of reading the image data from the line memories can be set not only after the process of writing the image data corresponding to one line to the line memories ends, but can also be advanced as long as the process of reading the image data from the line memories does not overtake the process of writing the image data to the line memories.

In the second preferred embodiment, the case in which the line memory unit 213 includes eight line memories and holds the image data of the colors (four colors of R, Gr, Gb, and B) of the four image capturing synchronization signals IHD has been described. However, the number of line memories of the line memory unit 213 is not limited to the number of line memories set in the second preferred embodiment. For example, the line memory unit may include twelve line memories and hold the image data of the colors (four colors of R, Gr, Gb, and B) of the six image capturing synchronization signals IHD. In this case, since a duration in which the process of writing the image data to the line memories of the line memory unit 213 and the process of reading the image data from the line memories of the line memory unit 213 do not fail is increased, the output timing of the image synchronization signal OHD can be set more freely.

According to the preferred embodiments of the present invention, as described above, the image data output from the image capturing unit are held temporarily in the line memories. Then, the image data held in the line memories are rearranged into the image data of the type to which the image processing device corresponds and the rearranged image data are output. That is, when the image capturing unit includes an imager that simultaneously outputs the image data of the plurality of pixels and the output type of the image data output by the image capturing unit (imager) is different from the input type of the image data to which the image processing device at the rear stage corresponds, the output type of the image data output by the image capturing unit (imager) can be matched with the input type of the image processing device. Thus, it is not necessary to develop an image processing device configured to correspond to the output type of the imager when the output type of the imager is changed. Further, a developed image processing device configured to correspond to the imager of a different output type may be applied to an image pickup device. Thus, it is not necessary to use an image processing device that has a configuration including an unnecessary circuit therein which is likely to be present in the output type of the imager, as in the method of the related art.

In the first preferred embodiment, the case in which the sequence of the image data of the vertical 2 ch type are rearranged into the sequence of the image data of the horizontal 2 ch type has been described. In the second preferred embodiment, the case in which the sequence of the image data of the horizontal 2 ch type is rearranged into the sequence of the image data of the vertical 2 ch type has been described. However, the configuration in which the image data are rearranged is not limited to the configurations described in the above-described preferred embodiments of the present invention. For example, the signal transmitting unit may be configured to realize both the process of rearranging the sequence of the image data of the vertical 2 ch type into the sequence of the image data of the horizontal 2 ch type and the process of rearranging the sequence of the image data of the horizontal 2 ch type into the sequence of the image data of the vertical 2 ch type. The rearranging processes may be switched under the control of the control unit (not shown). Even in this case, circuits not used in the signal transmitting unit are considerably smaller compared to the method of the related art corresponding to various output types of the pixel signals output from the imager in the image processing unit at the rear stage.

In the preferred embodiments, the case in which the line memory unit is used only when the image data to be rearranged are stored temporarily has been described. The method of using the line memory unit is not limited to the method described above in the preferred embodiments of the present invention. The line memory unit may be shared in processes of other functions of the image pickup device. For example, the line memory unit can be used as a memory shared in various processes necessary in the image pickup device, such as a data rearranging function of rearranging image data input in special order to be suitable for a Bayer array, a clock changing function of outputting data at a clock timing different from a clock timing at which the data are input to constrict a bus band, and a data rearranging function of rearranging image data input in series into image data in parallel.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image pickup device comprising:
an image capturing unit that includes a solid-state image pickup device having a plurality of pixels arrayed in a matrix form and simultaneously outputting pixel signals of the plurality of pixels adjacent to each other in a row or column direction in sequence while sequentially shifting the pixels that output the pixel signals in the row direction, and that simultaneously outputs image capturing signals respectively corresponding to the simultaneously output pixel signals in sequence from corresponding output terminals;
an image processing unit to which the image capturing signals respectively corresponding to the plurality of pixels adjacent to each other in the row or column direction of the pixels arrayed in the solid-state image pickup device are simultaneously input in sequence from corresponding input terminals, and which performs image processing on the input image capturing signals; and
a signal transmitting unit that rearranges a sequence of the image capturing signals simultaneously input from the image capturing unit into a sequence of the image capturing signals to which the image processing unit corresponds, and that simultaneously outputs the rearranged image capturing signals as the image capturing signals output by the image capturing unit in sequence to the image processing unit, wherein
the signal transmitting unit comprises a plurality of line memories that sequentially hold the plurality of image capturing signals simultaneously input from the image capturing unit and sequentially outputs the held image capturing signals,
the solid-state image pickup device of the image capturing unit is a solid-state image pickup device having a Bayer array,
the line memories hold the image capturing signals corresponding to at least one line of the pixels of the same color arrayed in the solid-state image pickup device, and
the signal transmitting unit includes the line memories that hold the image capturing signals of the pixels of the same color corresponding to at least two lines for each color of the pixels.

2. The image pickup device according to claim 1, wherein the signal transmitting unit comprises:
a first signal distributing unit that distributes the simultaneously input image capturing signals of each color corresponding to the pixels of each color to the line memories corresponding to each color of the pixels, respectively;
a memory writing control unit that sequentially writes the distributed image capturing signals of each color to the line memories of the corresponding color;
a memory reading control unit that sequentially reads the image capturing signals of each color held in the line memories corresponding to each color in order of the sequence of the colors of the image capturing signals to which the image processing unit corresponds; and
a second signal distributing unit that distributes the read image capturing signals of each color to the corresponding input terminals of the image processing unit, respectively.

3. The image pickup device according to claim 2, wherein after the image capturing signals of all kinds of the colors in the solid-state image pickup device are written by at least one image capturing signal to the line memories of the corresponding colors, the memory reading control unit starts a process of reading the image capturing signals held in the line memories and completes the process of reading the image capturing signals held in the line memories before a subsequent process of writing the image capturing signals starts.

4. The image pickup device according to claim 3, wherein when the image capturing unit sequentially outputs the image capturing signals of two pixels adjacent to each other in the column direction corresponding to the pixel signals of the two pixels adjacent to each other in the column direction of the pixels arrayed in the solid-state image pickup device and the image processing unit performs image processing on the image capturing signals of two pixels adjacent to each other in the row direction of the pixels arrayed in the solid-state image pickup device, the signal transmitting unit rearranges a sequence of the image capturing signals of the two pixels in the column direction simultaneously input from the image capturing unit into a sequence of the image capturing signals of the two pixels in the row direction to which the image processing unit corresponds and outputs the rearranged image capturing signals to the image processing unit as the image capturing signals of the two adjacent pixels in the row direction output by the image capturing unit.

5. The image pickup device according to claim 3, wherein when the image capturing unit sequentially outputs the image capturing signals of two pixels adjacent to each other in the row direction corresponding to the pixel signals of the two pixels adjacent to each other in the row direction of the pixels arrayed in the solid-state image pickup device and the image processing unit performs image processing on the image capturing signals of two pixels adjacent to each other in the column direction of the pixels arrayed in the solid-state image pickup device, the signal transmitting unit rearranges a sequence of the image capturing signals of the two pixels in the row direction simultaneously input from the image capturing unit into a sequence of the image capturing signals of the two pixels in the column direction to which the image processing unit corresponds and outputs the rearranged image capturing signals to the image processing unit as the image capturing signals of the two adjacent pixels in the column direction output by the image capturing unit.

6. A signal transmitting device comprising:
a plurality of line memories that respectively hold a plurality of image capturing signals simultaneously input from an image capturing unit which includes a solid-state image pickup device having a plurality of pixels arrayed in a matrix form and simultaneously outputting pixel signals of the plurality of pixels adjacent to each other in a row or column direction in sequence while sequentially shifting the pixels that output the pixel signals in the row direction, and that simultaneously outputs the image capturing signals respectively corresponding to the simultaneously output pixel signals in sequence from corresponding output terminals;

a first signal distributing unit that distributes the plurality of simultaneously input image capturing signals to the line memories corresponding to the image capturing signals, respectively;

a memory writing control unit that sequentially writes the distributed image capturing signals to the corresponding line memories;

a memory reading control unit to which the image capturing signals held in the line memories and respectively corresponding to the plurality of pixels adjacent in the row or column direction of the pixels arrayed in the solid-state image pickup device are simultaneously input in sequence from corresponding input terminals, and which sequentially reads the image capturing signals in a sequence of the image capturing signals to which an image processing unit that performs image processing on the input image capturing signals corresponds; and a second signal distributing unit that distributes the read image capturing signals to input terminals of the image processing unit corresponding to the image capturing signals, respectively.

7. The signal transmitting device according to claim 6, wherein the memory reading control unit generates a synchronization signal indicating an output duration of the image capturing signals held in the line memories in the sequence of the image capturing signals to which the image processing unit corresponds, and outputs the generated synchronization signal as a synchronization signal which is simultaneously output when the image capturing unit outputs the image capturing signals and indicates an output duration of the image capturing signals corresponding to one line of the pixels arrayed in the solid-state image pickup device.

8. The signal transmitting device according to claim 7, wherein after the image capturing signals of all kinds of colors in the solid-state image pickup device are written by at least one image capturing signal to the line memories of the corresponding colors, the memory reading control unit starts a process of reading the image capturing signals held in the line memories and completes the process of reading the image capturing signals held in the line memories before a subsequent process of writing the image capturing signals starts.

* * * * *